United States Patent
Nakatsuka

(10) Patent No.: US 8,634,101 B2
(45) Date of Patent: Jan. 21, 2014

(54) IMAGE FORMING APPARATUS, METHOD APPLICABLE TO THE IMAGE FORMING APPARATUS, AND CONTROL PROGRAM

(75) Inventor: Tadanori Nakatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1543 days.

(21) Appl. No.: 11/766,024

(22) Filed: Jun. 20, 2007

(65) Prior Publication Data

US 2007/0297022 A1    Dec. 27, 2007

(30) Foreign Application Priority Data

Jun. 23, 2006 (JP) ................. 2006-173625

(51) Int. Cl.
*H04N 1/40* (2006.01)

(52) U.S. Cl.
USPC .................. 358/1.18; 358/1.17; 358/468

(58) Field of Classification Search
USPC ......... 358/1.18, 1.17, 1.9, 2.1, 468, 500–501, 358/400–403
See application file for complete search history.

(56) References Cited

U.S. PATENT DOCUMENTS

| | | | |
|---|---|---|---|
| 6,449,062 B1* | 9/2002 | Endo | 358/400 |
| 6,883,981 B2 | 4/2005 | Kizaki et al. | |
| 6,898,389 B2 | 5/2005 | Osada | |
| 2005/0286090 A1* | 12/2005 | Ahne et al. | 358/452 |
| 2006/0200751 A1* | 9/2006 | Underwood et al. | 715/501.1 |
| 2008/0112015 A1* | 5/2008 | Liu | 358/402 |

FOREIGN PATENT DOCUMENTS

| | | | |
|---|---|---|---|
| JP | 10-164350 A | 6/1998 | |
| JP | 2000-175028 A | 6/2000 | |
| JP | 2002-215725 A | 8/2002 | |
| JP | 2003-330671 A | 11/2003 | |
| JP | 2004-185489 A | 7/2004 | |

* cited by examiner

*Primary Examiner* — Thomas D Lee
*Assistant Examiner* — Stephen M Brinich
(74) *Attorney, Agent, or Firm* — Canon USA Inc. IP Division

(57) ABSTRACT

A method for controlling an image forming apparatus includes: storing data in which pages are defined; specifying insertion data to be inserted into the data; providing instructions to insert the insertion data specified at a specific page of the data stored; determining whether the insertion data specified has been input by using the input device specified by the specifying unit; and inserting the input insertion data at the specific page indicated if it is determined that the insertion data specified has been input.

9 Claims, 16 Drawing Sheets

FIG. 14

BINDING APPLICATION
(DOCUMENT INPUT RESERVATION)
(MODE>>INSERT PAGE>>INPUT CONDITIONS)   SET CONDITIONS   BACK   ?

○ Please input document input conditions and press set button.
Page 3

BOX number [10] — 1401
Expected time of BOX reception [3 days] from [10:00] — 1402, 1403
ID [12345] — 1404
File name [monthly-report.txt]

○ Please input binding and printing conditions.
Time of printing [May 5,] [2006] [10:00] — 1405
Contact address [abc@xyz.co.jp] — 1406

TOP MENU
MY PORTAL
SET BINDING
INSERT PAGE
DELETE PAGE
LOG OUT

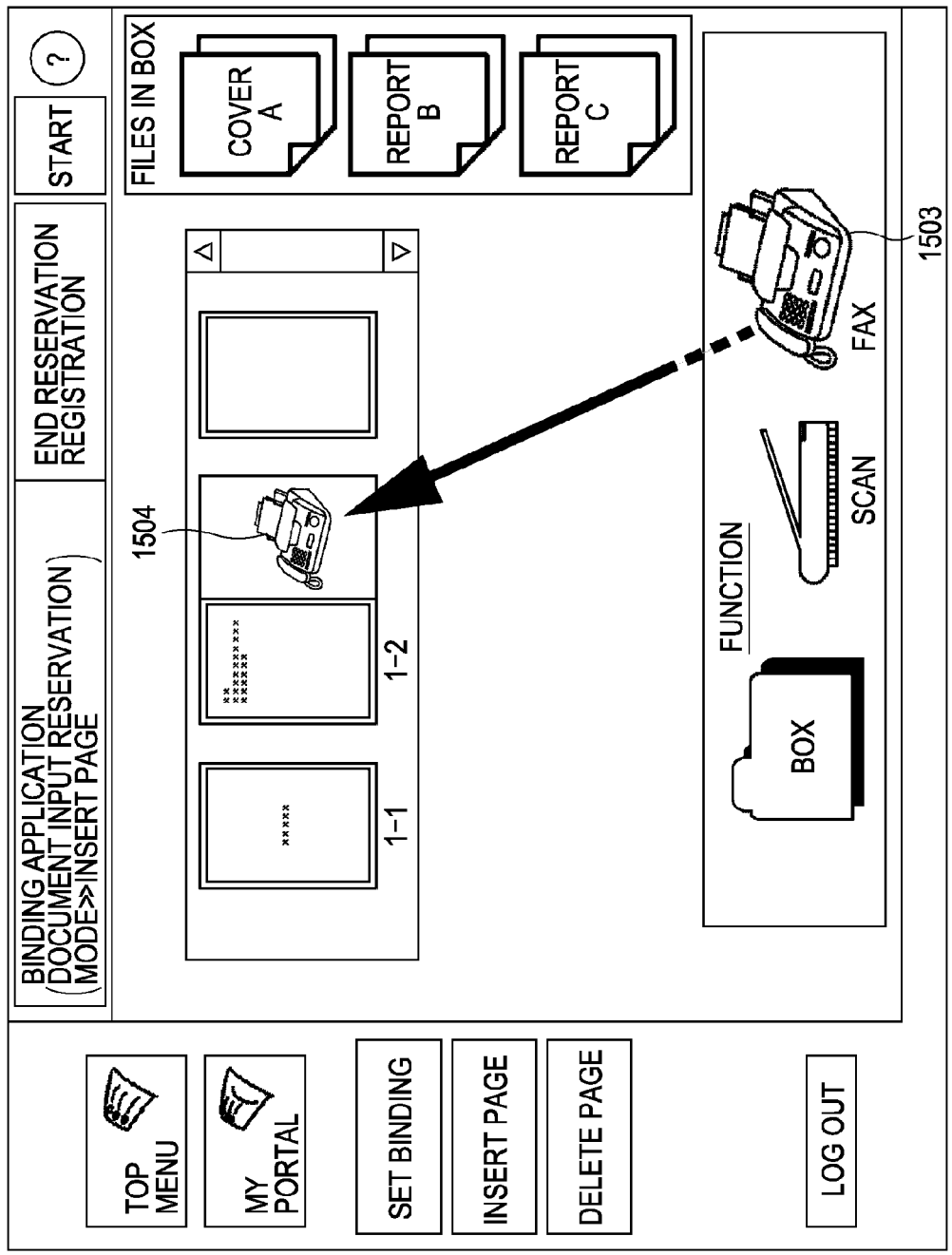

IMAGE FORMING APPARATUS, METHOD APPLICABLE TO THE IMAGE FORMING APPARATUS, AND CONTROL PROGRAM

BACKGROUND OF THE INVENTION

1. Field of the Invention

The present invention relates to an image forming apparatus having a function of a multifunction apparatus, including a printer, a scanner, a facsimile, and a copy machine, and also relates to a method for controlling the image forming apparatus and a control program.

2. Description of the Related Art

There have conventionally been programs that are executable in an image forming apparatus having a function of a multifunction apparatus, including a printer, a scanner, a facsimile, and a copy machine. In such an apparatus, a program is selected on a touch panel of a display unit, and a user operation required by the program is input on the touch panel. Also, the program is executed by allowing the user to operate the program through a numeric keypad (e.g., see Japanese Patent Laid-Open No. 2003-330671).

On the other hand, there has been a binding application to perform imposition of arranging a layout in a page and to instruct a finisher to fold and staple printed sheets (e.g., see Japanese Patent Laid-Open No. 2004-185489).

In the above-described known arts, however, when a user wants to insert a document image captured by a scanner of a multifunction apparatus into a document, the user needs to store the document image in a hard disk of the multifunction apparatus and make a file of the document image. Furthermore, the user needs to insert the file into a desirable part of the document by using a binding application provided in the multifunction apparatus. These operations cause a burden for the user. This is the same for another function of the multifunction apparatus, for example, inserting a document input by facsimile, and inserting a document in the hard disk in the multifunction apparatus transmitted from a PC (personal computer) connected to a network.

For example, assume a case where a document is transferred from the PC connected to the network to the hard disk in the multifunction apparatus and the document is bound and printed by the binding application in the multifunction apparatus. In this case, when the document to be created includes a report and data transmitted from someone, an entire process including transfer, instruction of binding, and printing needs to be performed after transmission from the person completes. This is also a burden for the user. These problems are not limited to the binding application.

SUMMARY OF THE INVENTION

According to an embodiment of the present invention, there is provided a method for controlling an image forming apparatus. The method includes: storing data in which pages are defined; specifying insertion data to be inserted into the data and an input device; providing instructions to insert the insertion data specified at a specific page of the data stored; determining whether the insertion data specified has been input by using the input device specified by the specifying unit; and inserting the input insertion data at the specific page indicated if it is determined that the insertion data specified has been input.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 6 through FIG. 16 show exemplary operation screens of the copy machine as an example of the image forming apparatus.

DESCRIPTION OF THE EMBODIMENTS

An aspect of this embodiment is providing a mechanism capable of easily capturing data into data including pages in an image forming apparatus and flexibly processing the captured data. This embodiment enables providing instructions to input an image obtained by a device of a multifunction apparatus to an application, so that user friendliness can be improved.

The image obtained by the device of the multifunction apparatus can be captured into the application only when a preset condition is satisfied. Furthermore, it becomes possible to perform reserved printing in which scanning, FAX reception, or BOX reception is waited for and printing starts upon satisfaction of the condition. Accordingly, user friendliness can be improved. Hereinafter, the embodiment of the present invention is described.

Figure 1:
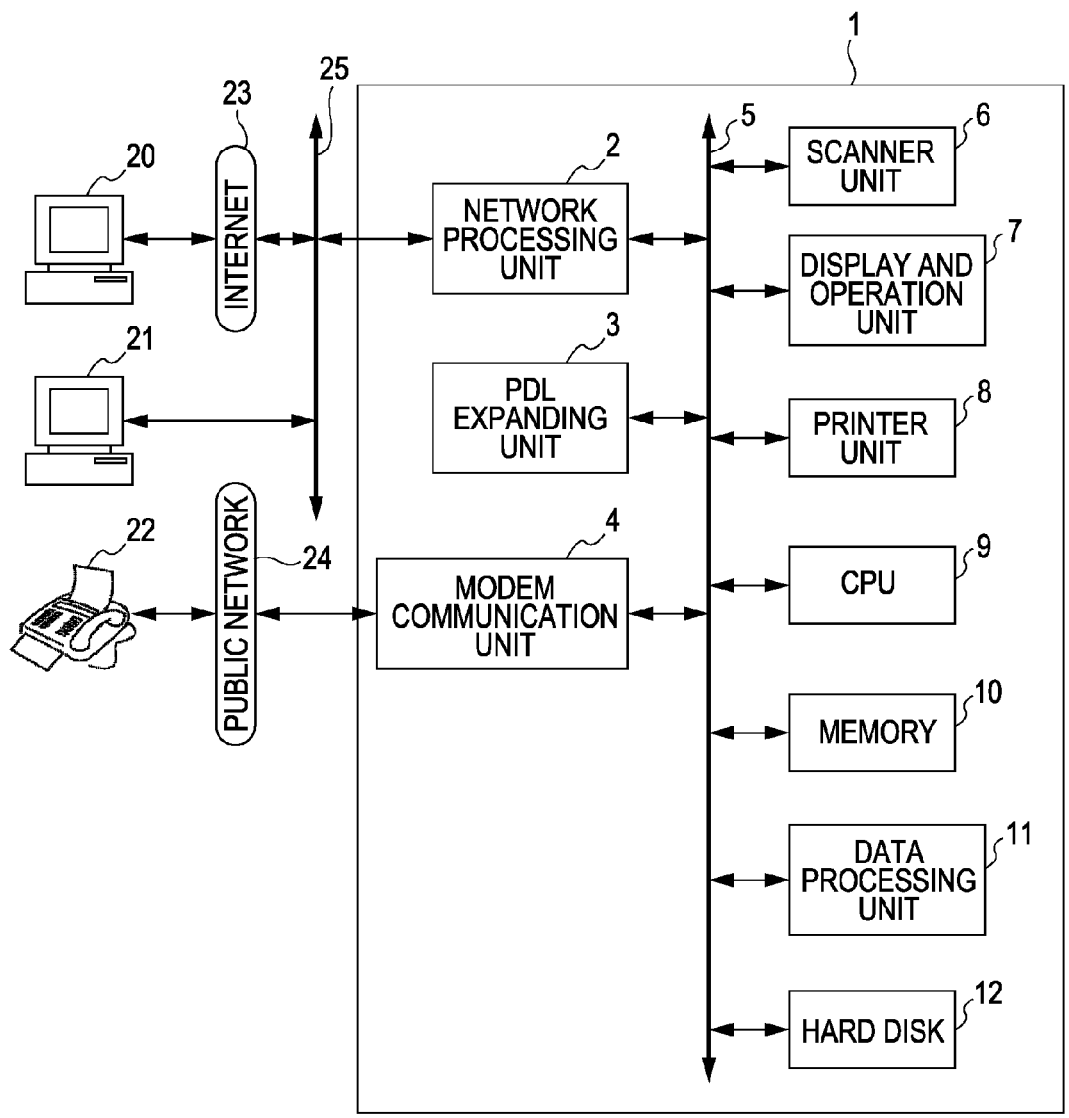
FIG. 1 is a block diagram of a system including a copy machine, a computer, and a facsimile.

FIG. 1 is a block diagram of a system including a copy machine 1, computers, and a facsimile (FAX). This figure shows a relationship between a copy machine (multifunction apparatus) 1 serving as an example of the image forming apparatus according to the embodiment of the present invention and the computers and the FAX connected to the copy machine 1 via a network.

A network processing unit 2 controls transmission/reception of data to/from a computer 21 connected via a network 25 or a computer 20 connected via the Internet 23. The network processing unit 2 functions as a receiving unit.

A PDL expanding unit 3 expands print data PDL transmitted from a computer to a print image in accordance with an attribute set in a page. At this time, if a specified print layout requires two pages being printed on one side of a sheet, two scaled-down pages are printed on one side of the sheet. This is called "2 in 1 printing". Then, the PDL expanding unit 3 transfers the print image to a printer unit 8 via an internal bus 5. The printer unit 8 prints the print image. The printer unit 8 includes a duplex/staple unit, which performs duplex printing if the PDL has a duplex attribute. Also, the duplex/staple unit staples a plurality of pages on which image information is printed. A predetermined storage area in a hard disk 12 serves as a BOX, which holds print images transferred from a computer. The print images can be printed by the printer unit 8.

A modem communication unit 4 controls transmission/reception of data to/from the FAX 22 connected via a public network 24.

A scanner unit 6 reads a document set thereon. A CPU (central processing unit) 9 transfers the read image data to a data processing unit 11. The image data is accumulated in a memory 10 after being processed, for example, rotated or scaled.

A display and operation unit 7 is a liquid crystal display including a touch panel and serves as a display unit. The liquid crystal display displays a state of an application and receives input from a user.

The CPU 9 executes the application stored in the memory 10, performs an operation in each processing unit, and transfers data.

Figure 2:
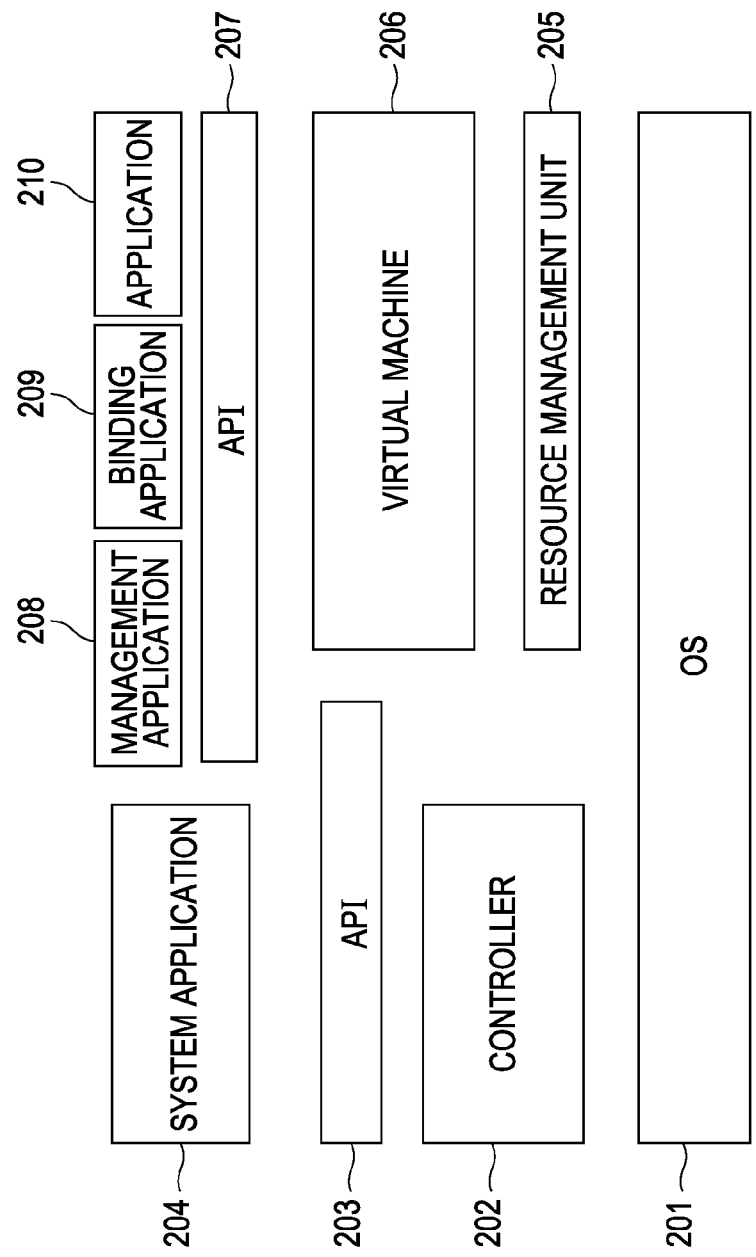
FIG. 2 shows a software configuration of the copy machine as an example of an image forming apparatus according to an embodiment of the present invention.

FIG. 2 shows a software configuration of the image forming apparatus 1 according to the embodiment of the present invention.

An OS (operating system) 201 is a first execution environment according to the embodiment of the present invention and controls the image forming apparatus. The OS 201 includes a group of modules and libraries of a real-time OS capable of controlling various functions of the copy machine in real time.

A controller 202 operates in the OS 201 as the first execution environment. The controller 202 includes a module controlling the scanner unit 6, the display and operation unit 7, the printer unit 8, the modem communication unit 4, and the PDL expanding unit 3.

An API 203 is an application programming interface (hereinafter referred to as an API). The API 203 performs a process to access the controller 202 in response to a command string input from an application.

A system application 204 is an application operating in the OS 201 as the first execution environment. The application requests various processes to the controller 202 by using the API 203. Also, the application is capable of communicating with the computers 20 and 21 on the network 25 via the network processing unit 2.

A virtual machine 206 is a second execution environment that is optimal to execute a specific application. This environment is realized by a virtual machine of JAVA®, for example. An API 207 is used by an application in the virtual machine 206 as the second execution environment to access the controller 202. The controller 202 operates in the real-time OS 201 as the first execution environment. The API 207 has a function of a converting module to call the API 203 in this embodiment.

A management application 208 manages other applications in the virtual machine 206 as the second execution environment.

Applications 209 and 210 operate in the virtual machine 206 as the second execution environment. The applications 209 and 210 request various processes to the controller 202 by using the API 207. Also, the applications 209 and 210 are capable of communicating with the computers 20 and 21 on the network 25 via the network processing unit 2. In this embodiment, the application 209 serves as a binding application.

A resource management unit 205 manages resources used by the virtual machine 206 as the second execution environment and operates in the real-time OS 201 realizing the first execution environment. The resource management unit 205 performs control so that resources including a memory are not used beyond a predetermined range by the virtual machine 206 realizing the second execution environment, the API 207, or all applications in the virtual machine 206.

Figure 3:
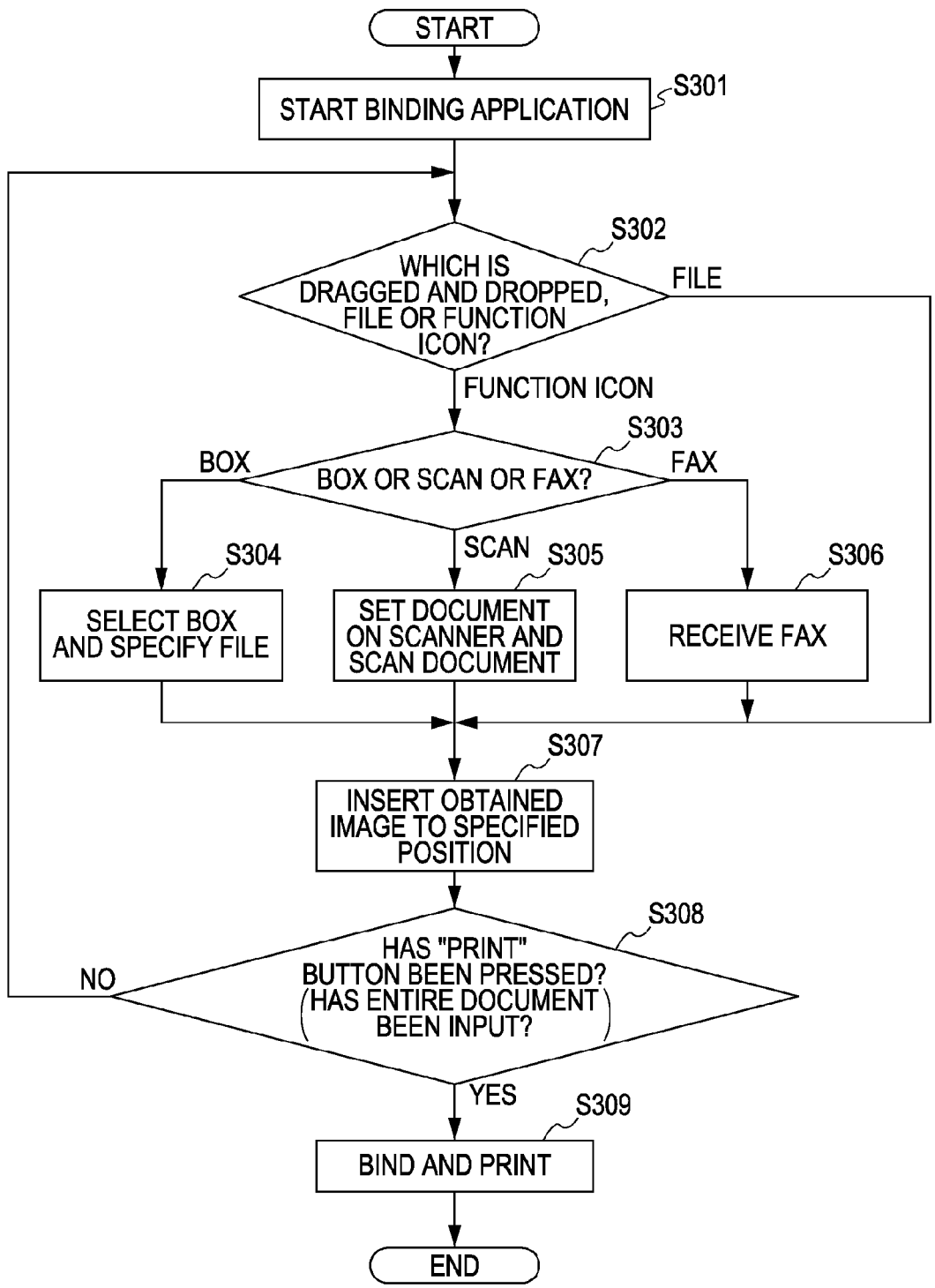
FIG. 3 is a flowchart in a "bind and print without reservation mode" of the copy machine as an example of the image forming apparatus according to the embodiment.
Figure 6:
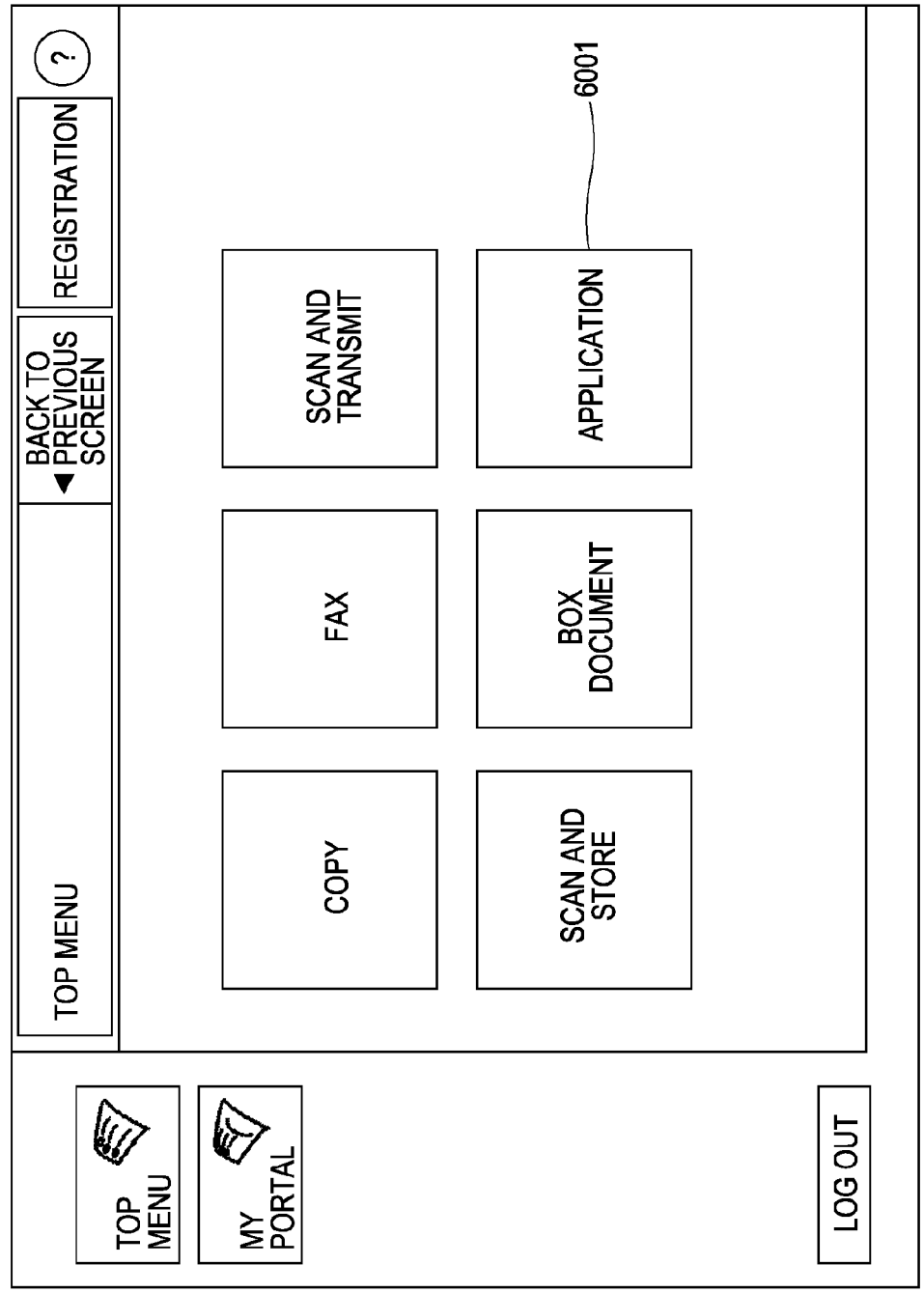
Figure 7:
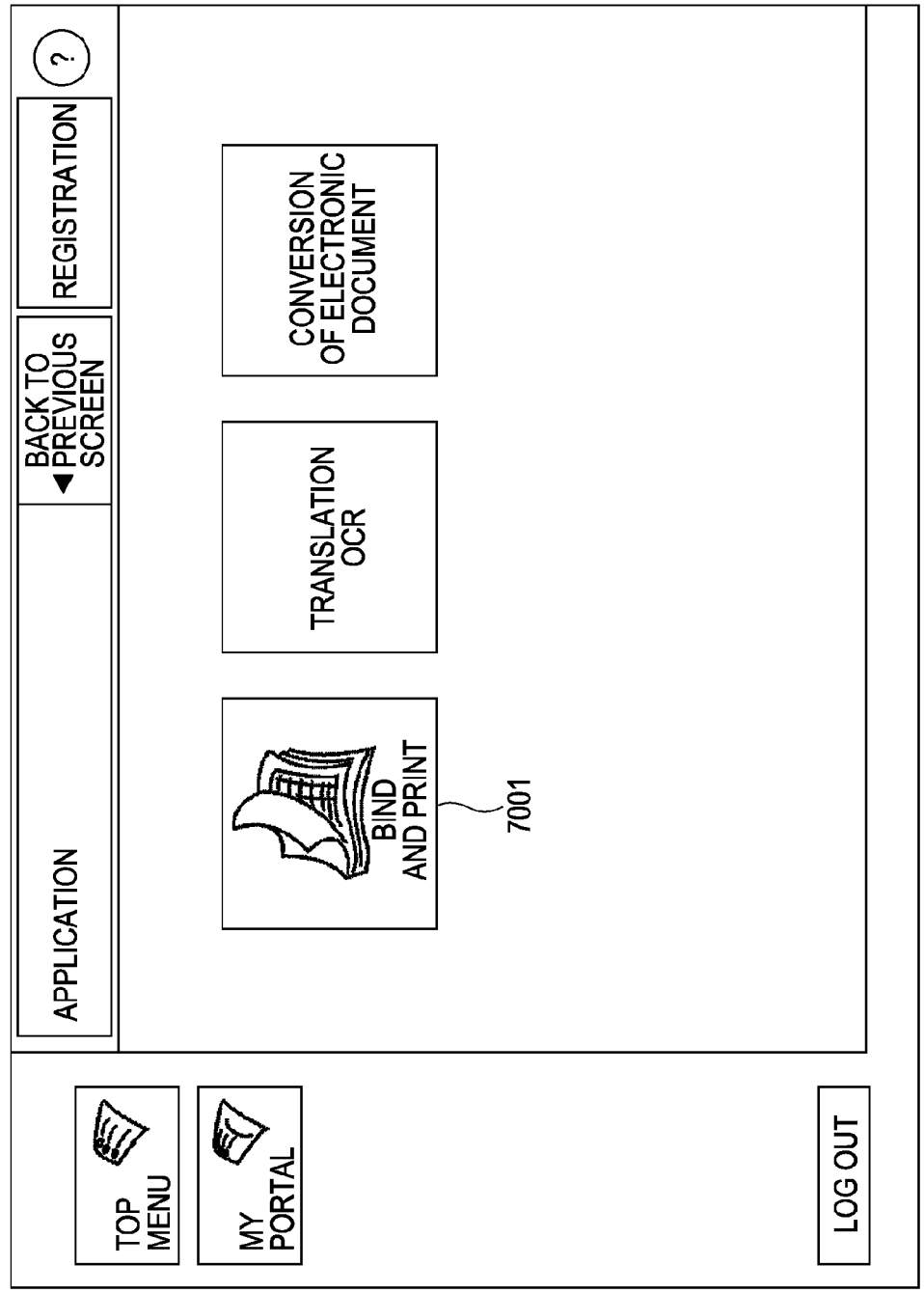

Hereinafter, an example of a process performed by the CPU 9 is described with reference to the flowchart shown in FIG. 3. FIG. 6 shows an example of a top menu of the copy machine according to this embodiment. Icons of respective functions are displayed in the display and operation unit 7 by the system application 204. When the system application 204 detects that an icon 6001 is indicated on the user interface, a plurality of applications, one of which being selected and started, are displayed (FIG. 6). Icons of the binding application 209 and the applications 210 of translation OCR (optical character recognition) and conversion of electronic document stored in the copy machine 1 are displayed. Among them, the icon 7001 of the binding application is selected and displayed (FIG. 7).

In step S301, the binding application 209 is selected and started. The binding application 209 is started when the system application 204 detects that an icon 7001 is specified on the user interface.

Figure 8:
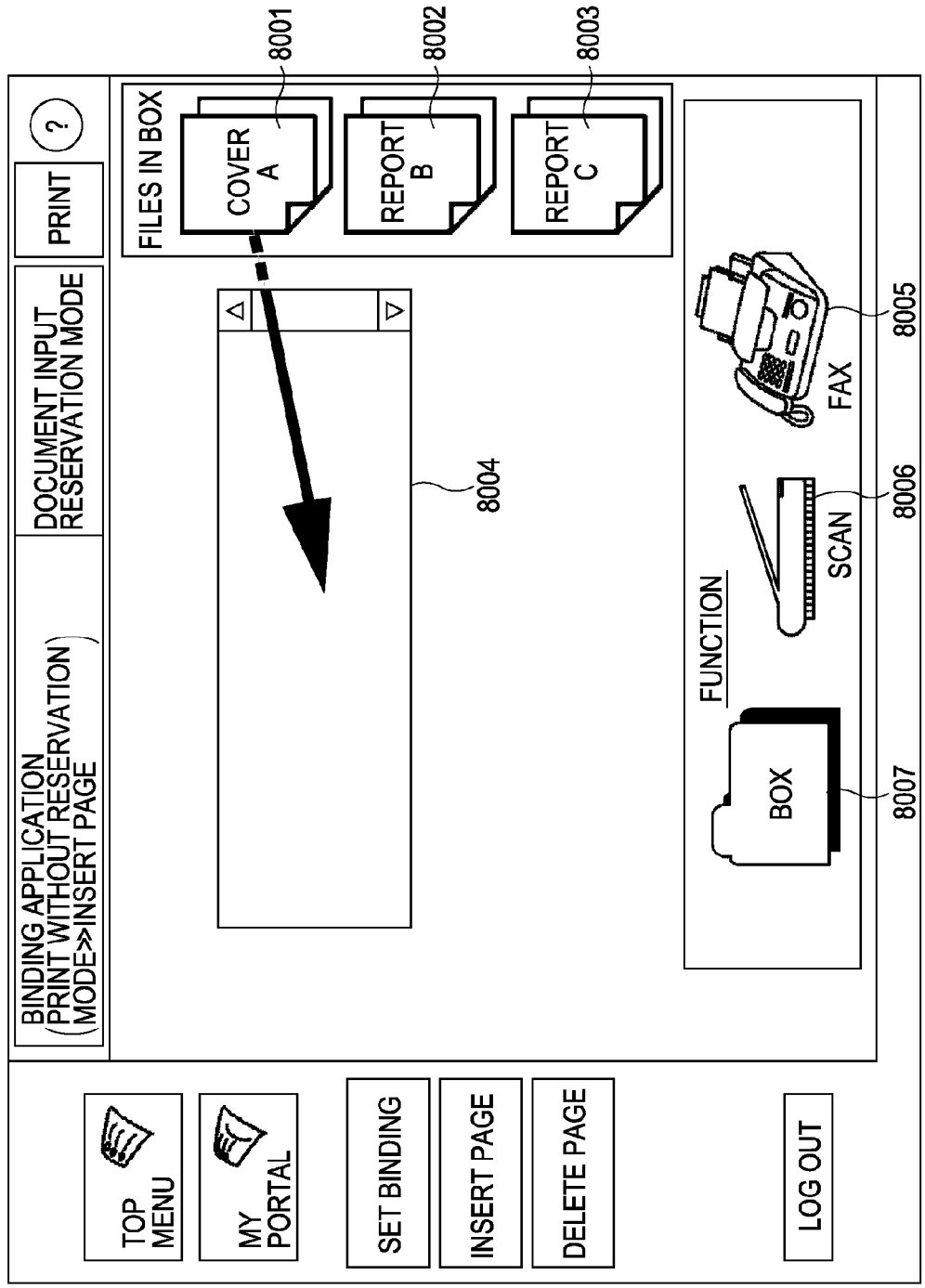

FIG. 8 shows a state of the screen where the binding application 209 has started and a file "cover A" 8001 included in a BOX in the hard disk 12 is to be inserted by drag and drop.

In step S302, the binding application 209 determines which of a file and a function icon has been dragged and dropped.

Figure 9:
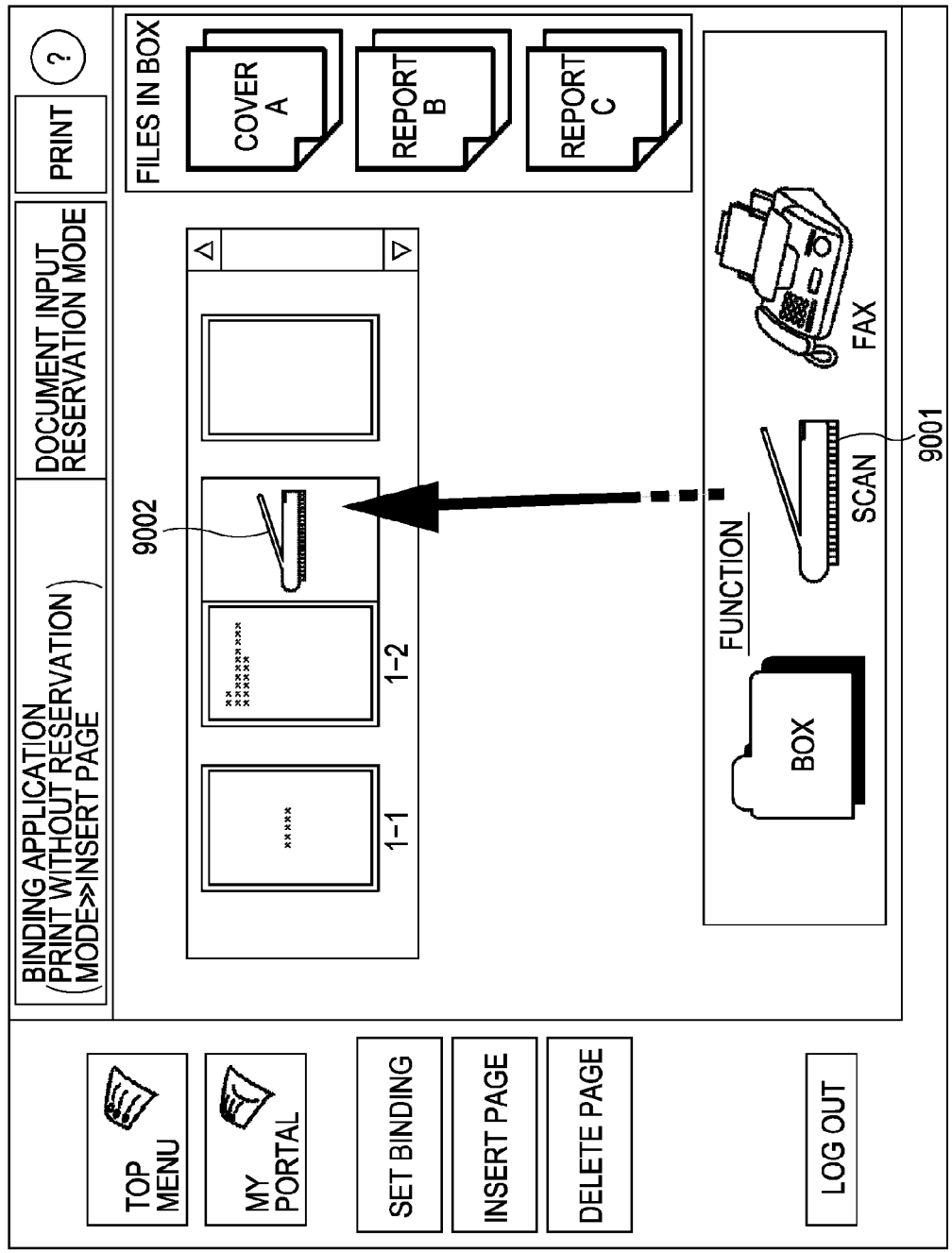

If it is determined in step S302 that a file (e.g., "cover A" 8001, "report B" 8002 or "report C" 8003 in FIG. 8) has been dragged and dropped into an area 8004, the process proceeds to step S307. In step S307, the binding application 209 inserts an obtained image to a specified position. Herein, the image of "cover A" obtained from the dragged and dropped file is inserted to the specified position. In this example, there is no document and thus the "cover A" is displayed at the top. FIG. 9 shows the cover in the first page and the head of a report in the second page. Then, the process proceeds from step S307 to step S308.

In step S308, the binding application 209 determines whether the "print" button at the upper right in FIG. 9 has been pressed. If it is determined that the print button has been pressed, the binding application 209 determines that the entire document has been input, and the process proceeds to step S309. In step S309, a binding process is performed and the printer unit 8 performs printing. The binding process means binding in a broad sense. For example, the application executes a printer driver so as to interpret a job ticket including instructions of various processes, such as duplex printing, stapling, and N-UP. Then, instructions are provided so that PDL data on which setting of the job ticket is reflected is formed on the basis of application data.

On the other hand, if it is determined in step S308 that the print button has not been pressed, processing returns to step S302. In step S302, if the binding application 209 determines that a function icon has been dragged and dropped, the process proceeds to step S303. In step S303, the binding application 209 determines which function icon has been dropped.

In the example shown in FIG. 8, the function icons include a BOX function icon 8007, a SCAN function icon 8006 and a FAX function icon 8005. FIG. 9 shows a state where a SCAN icon (scanner function) 9001 is dragged and dropped on the third page. In this way, there is no need to obtain a document image from the scanner unit, hold the document image as a file in a BOX (hard disk), and call the file in the BOX from the binding application. In this example, icons of the respective functions are dragged and dropped to the binding application 9002, so that user friendliness can be improved.

In this case, the SCAN icon (scanner function) is selected in step S303, and thus the process proceeds to step S305. If the BOX function is selected, the process proceeds to step S304. If the FAX function is selected, the process proceeds to step S306.

Figure 10:
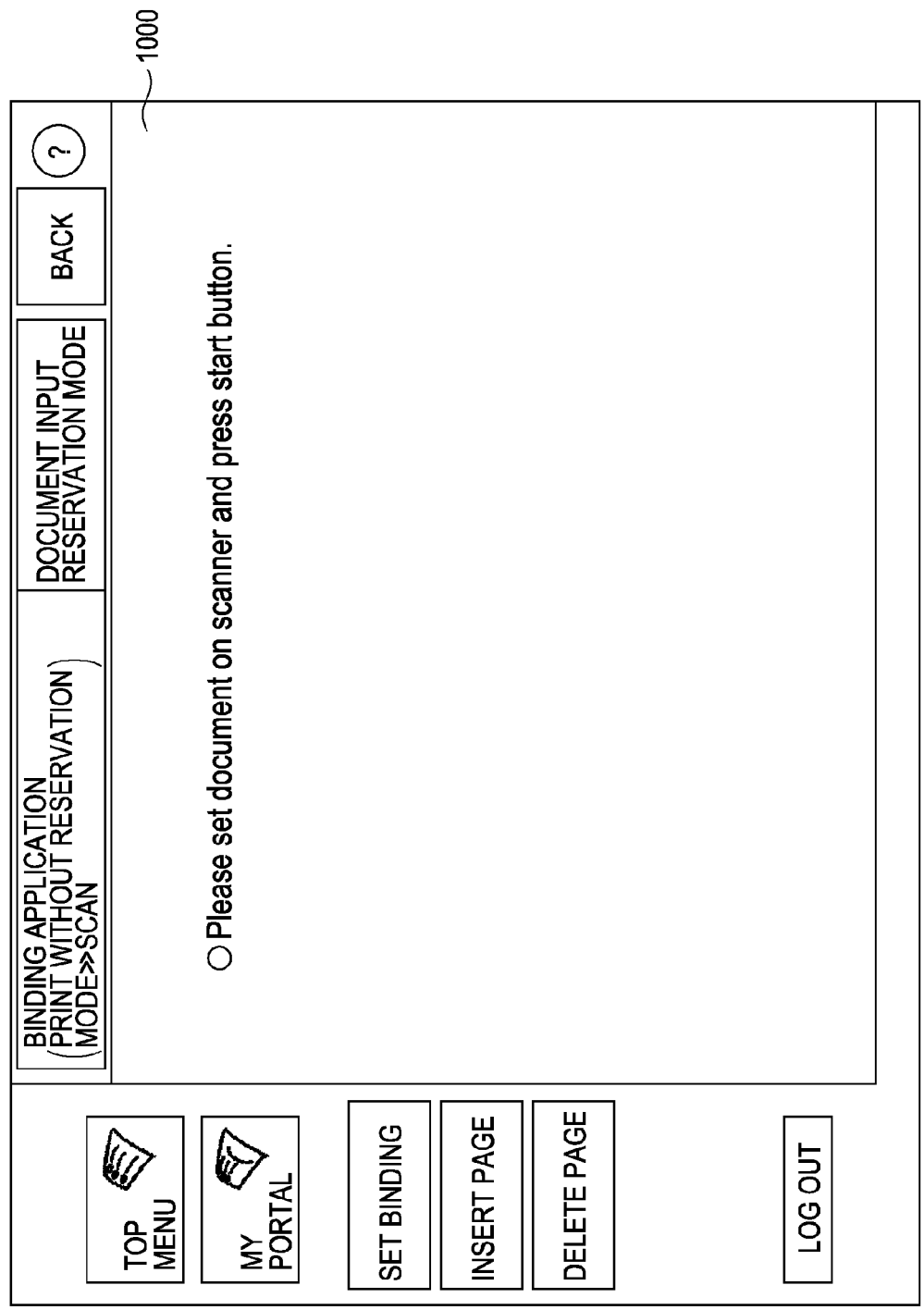

In step S305, the controller 202 waits until a document is set on the scanner. If the controller 202 detects that the document has been set, the controller 202 instructs a scanner controller to scan the document. FIG. 10 shows a screen 1000 where the user is requested to set a document and start scanning. This state is held until the start button is pressed and the document is appropriately scanned. If the user wants to cancel the scanning, he/she presses the "back" button on the upper right, so as to back to the screen shown in FIG. 9.

After the controller 202 notifies the binding application 209 that the scanning process has completed, the binding application 209 receives scanned data from the controller 202. At this time, the binding application 209 displays thumbnails of the document images captured by the scanner on the third page and thereafter instead of the scanner icon. For example, if a document of five pages is scanned, the scanned document is inserted to the third to eighth pages.

After that, binding and printing are performed upon press on the "print" button, as in the above-described example of the file.

Hereinafter, an example of improving user friendliness by performing binding and printing is described. In this example, a page is inserted if a preset condition is satisfied.

Figure 4:
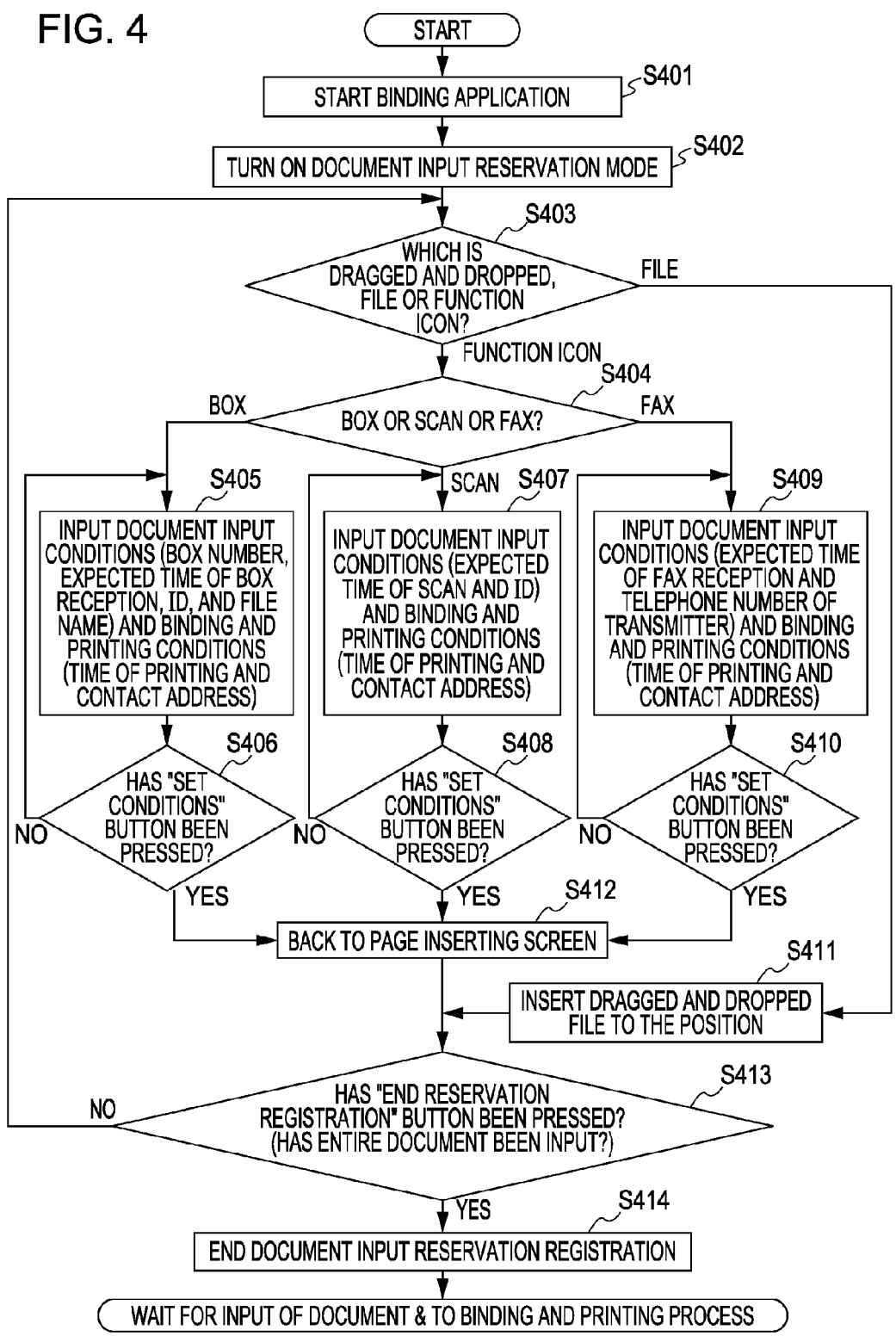
FIG. 4 is a flowchart in "document input reservation setting" of the copy machine as an example of the image forming apparatus according to the embodiment.
Figure 5:
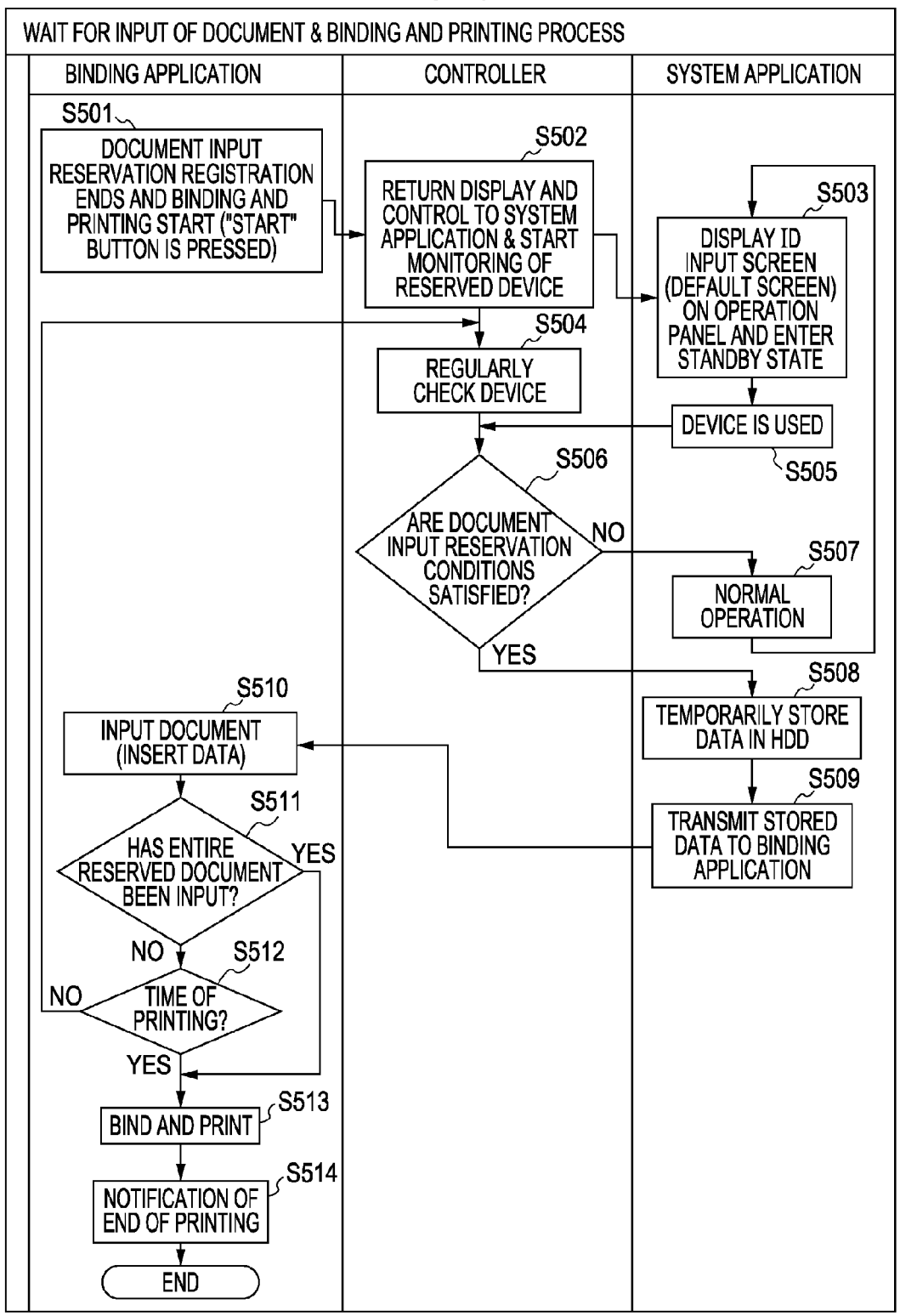
FIG. 5 is a flowchart of a "process of waiting for input of document and binding and printing" of the copy machine as an example of the image forming apparatus according to the embodiment.

FIGS. 4 and 5 are flowcharts illustrating another example of the process using the CPU 9. The process is described below with reference to the flowcharts.

FIG. 4 is a flowchart showing a process of setting document input reservation conditions (document input conditions).

First, the binding application 209 is started in step S401.

In step S402, a document input reservation mode is turned on. Specifically, the binding application 209 determines whether the "document input reservation mode" button on the upper right in FIG. 8 is pressed. Then, as in the above-described example, the binding application 209 captures the file "cover A" 8001 from the BOX.

In step S403, the binding application 209 determines which of a file and a function icon has been dragged and dropped. If a file is dragged and dropped, the process proceeds to step S411, where the binding application 209 inserts the file to the position. This state corresponds to the first and second pages (1-1 and 1-2) of a bound pages of a book shown in FIG. 11.

Figure 11:
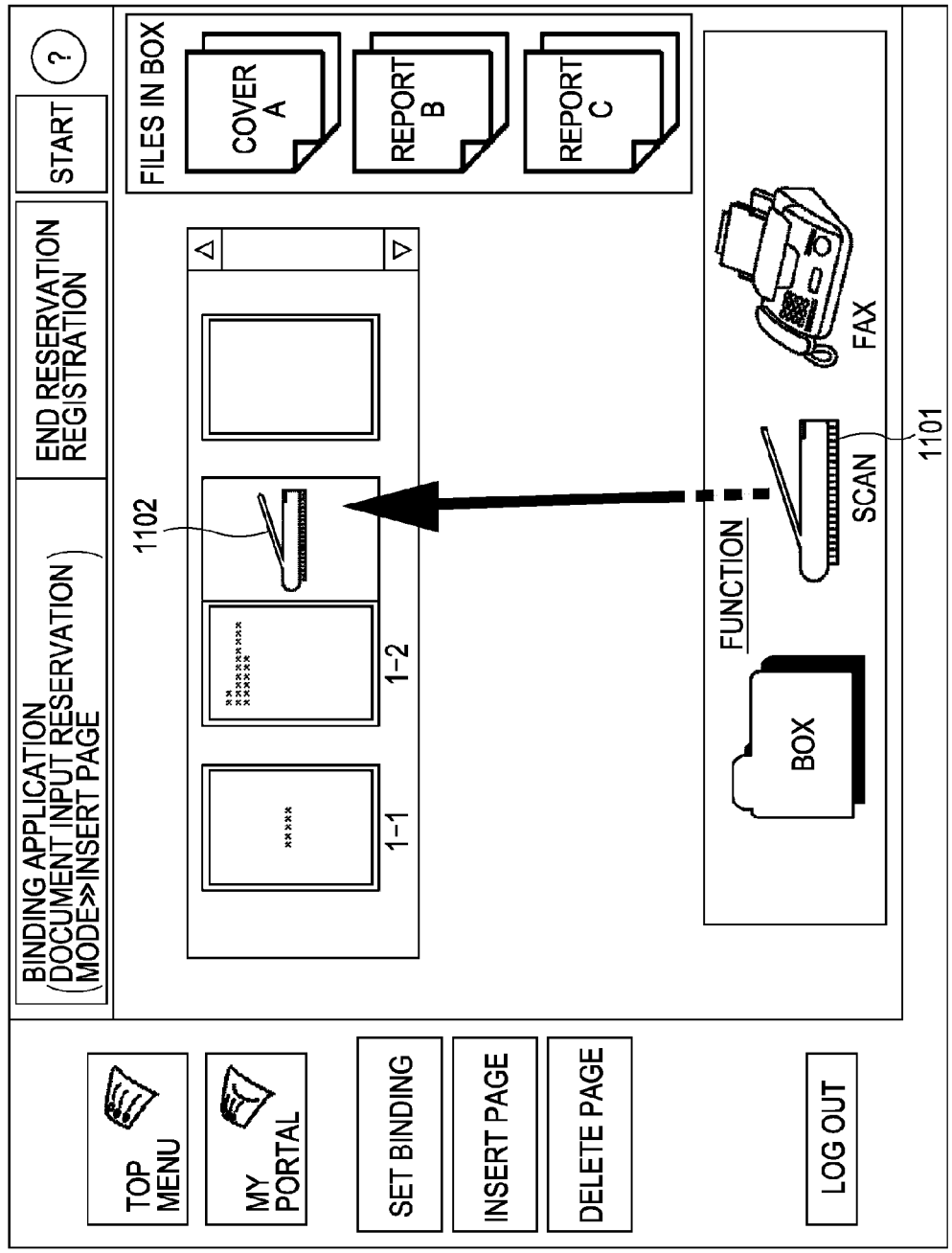

The position 1102 where the SCAN icon 1101 is dragged and dropped in FIG. 11 corresponds to the third page in the bound pages of the book indicated by an arrow in FIG. 11.

On the other hand, if it is determined in step S403 that a function icon is dragged and dropped, processing proceeds to step S404. In step S404, the binding application 209 determines whether the function corresponding to the dragged and dropped icon is BOX, SCAN, or FAX. In this case, the function is the SCAN function and thus the process proceeds to step S407.

Figure 12:
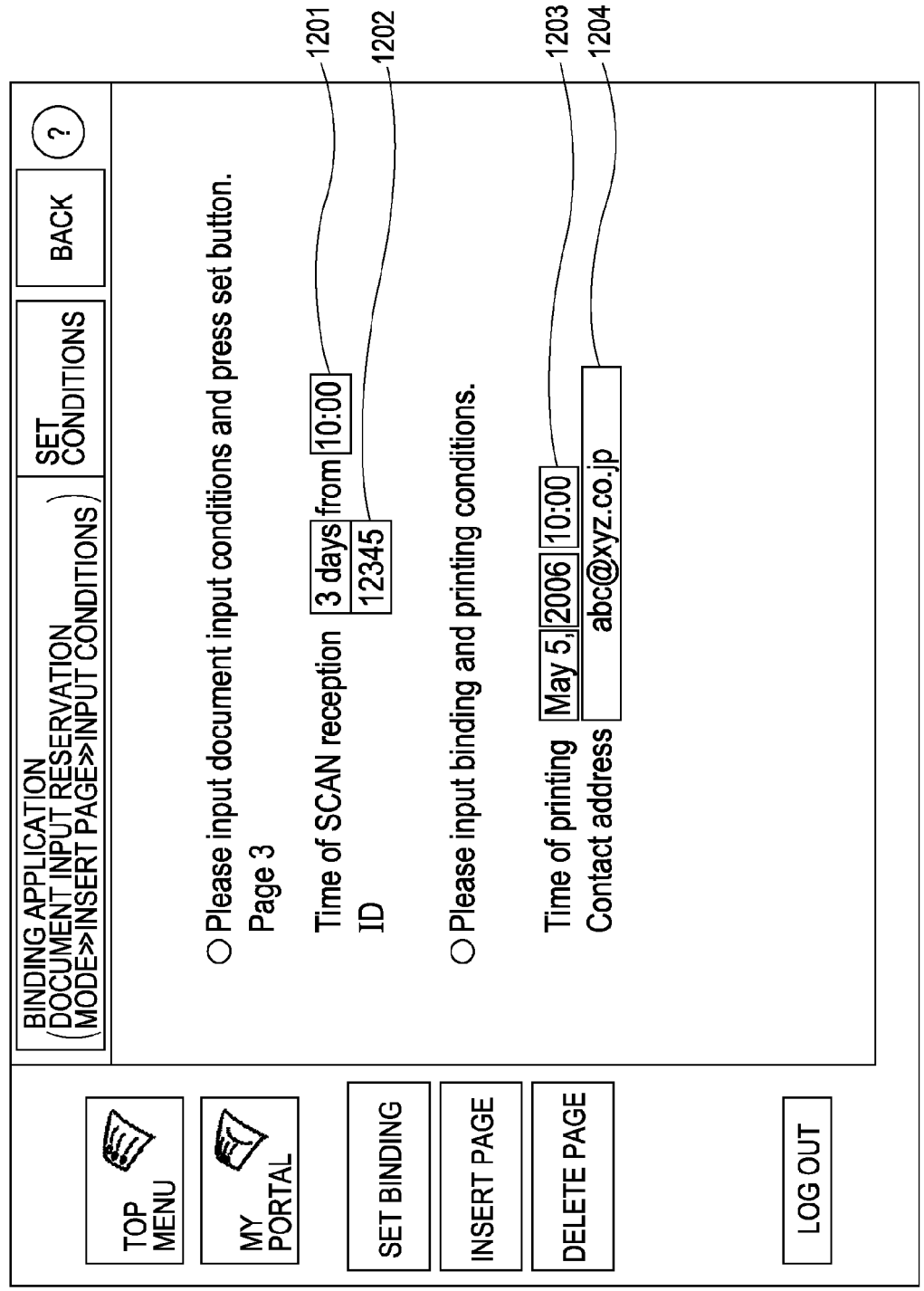

In step S407, the binding application 209 waits for input of document input conditions and binding and printing conditions. This state is shown in FIG. 12. In the SCAN function, expected time of SCAN 1201 can be specified as the document input conditions. In this example, three days from the set time 10:00 on May 1 can be set as the document input conditions. The document input conditions can be specified to the binding application 209 from the operation unit. The information of May 1, 2006 can be specified as expected time of SCAN.

When the time is not specified, input of document is accepted until just before time of printing. Also, ID can be specified in a section 1202. The ID is not necessarily specified, but anyone can input a document from the scanner.

As the binding and printing conditions, time of printing when binding and printing are performed can be specified in a section 1203, and a contact address used to transmit a notification of end of printing by e-mail can be specified in a section 1204. The conditions are input by the user through the operation unit. The input conditions are transmitted to the binding application 209. Upon press on the "set conditions" button, the screen shown in FIG. 11 is displayed.

Then, in step S408, the binding application 209 determines whether the "set conditions" button on the upper right in FIG. 12 has been pressed. If the binding application 209 determines that the button has been pressed, the process proceeds to step S412. The state where the conditions have been input is maintained until the "set conditions" button is pressed. If the user wants to cancel the input conditions, he/she can clear the input conditions by pressing the "back" button on the upper right so as to back to the screen shown in FIG. 11 (step S407).

In step S412, the page inserting screen is displayed, as shown in FIG. 11.

Then, in step S413, the binding application 209 determines whether the "end reservation registration" button has been pressed. The button is at the upper right in FIG. 11.

If it is determined that the "end reservation registration" button has been pressed, the binding application 209 determines that the entire document has been input, and the process proceeds to step S414. Then, a standby state occurs. Then, a process is performed according to the flowchart shown in FIG. 5.

If it is determined in step S413 that a button other than the "end reservation registration" button has been pressed, the binding application 209 determines that document input reservation continues. Thus, the process returns from step S413 to S403, and the above-described steps are performed.

Figure 16:
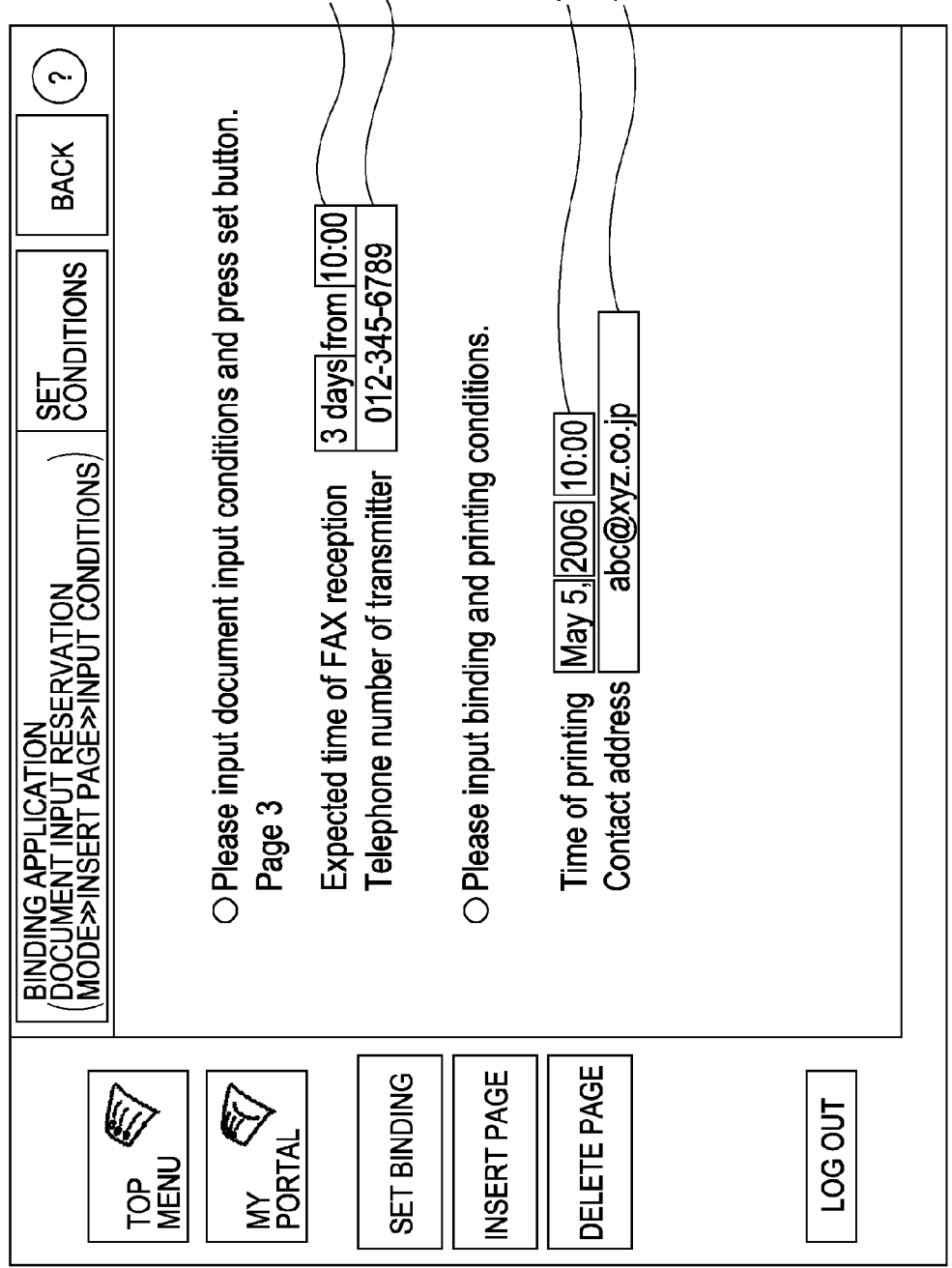

An example of scanning is described above, but this process can also be applied to BOX in steps S405 and S406 (see FIGS. 13 and 14) and FAX steps S409 and S410 (see FIGS. 15 and 16).

Figure 13:
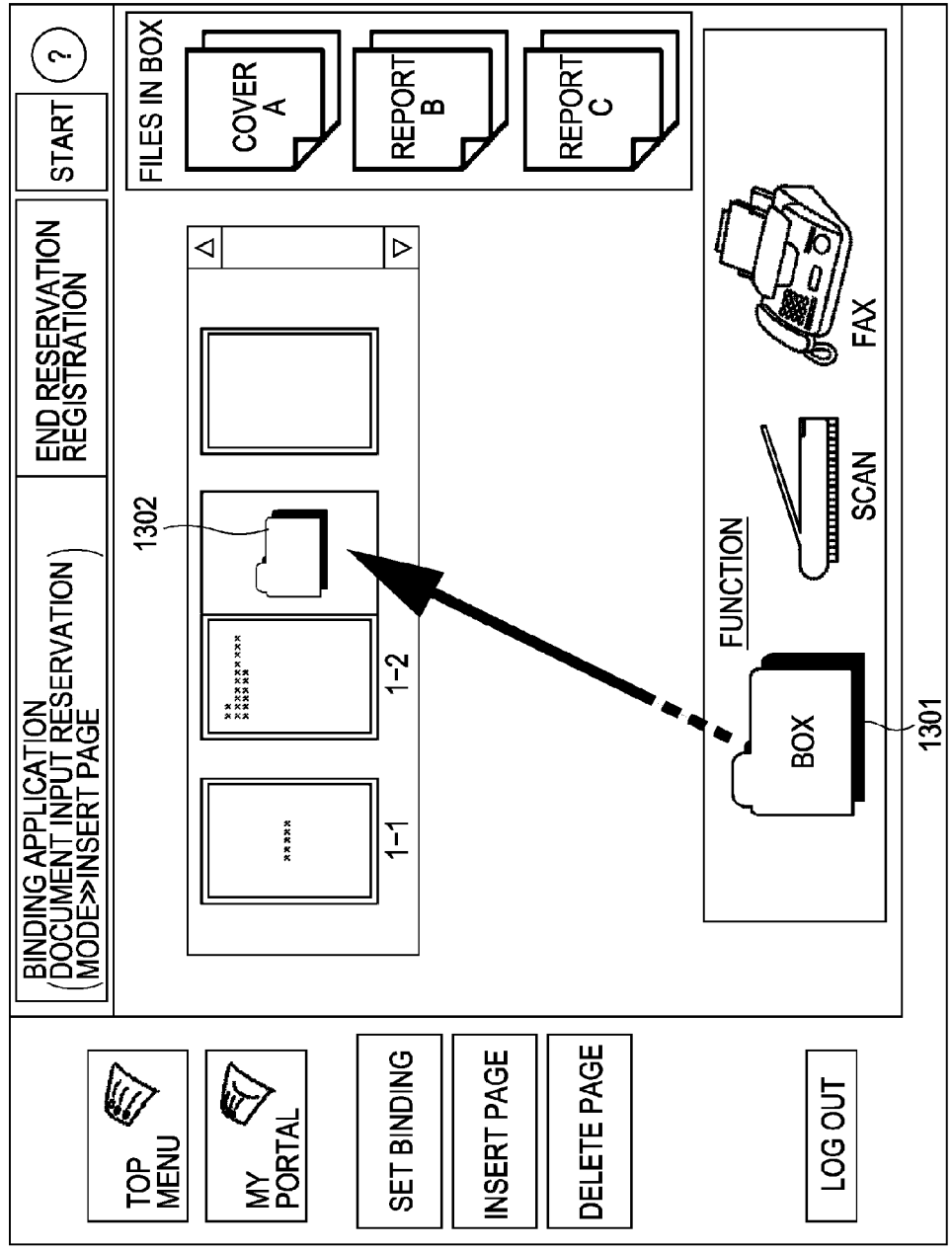

In FIG. 13, the icon (button) of the BOX function 1301 is dropped on the third page 1302. Accordingly, the data stored in the BOX is inserted to the third page of the document data in the conditions set as shown in FIG. 14. The BOX function is a data management system to manage the data stored in the hard disk 12. In the example shown in FIG. 14, instructions are provided so as to capture the data in the BOX No. 10 indicated in a box number field 1401 for three days from 10:00 (as indicated in a time field 1402), May 1, 2006 (not shown). The information of May 1, 2006 can be specified as the expected time of SCAN. The functions of the "back" button 1408 and the "set conditions" button 1407 are the same as those in FIG. 12.

The ID "12345" indicated in an ID field 1403 is an ID that is used by the application to manage the data to be captured as a job. In a section 1404, the name of the file to be captured is specified. That is, the data of the file "monthly-report.txt" is captured upon input of the data. In this example, binding and printing conditions can also be specified. As shown in FIG. 14 in a time of printing field 1405, it is scheduled that printing is performed at 10:00 on May 5, 2006. Also, the contact address "abc@xyz.co.jp" used for notification of printing is specified in a contact field 1406. In this example, the document input conditions are satisfied if all of the input conditions 1401, 1402, and 1404 are satisfied. Alternatively, it can be determined that the conditions are satisfied if any one of the conditions is satisfied.

FIG. 15 shows a state where instructions are provided so that an icon 1503 indicating the FAX function is inserted to a part 1504 in the third page. FIG. 16 shows a state where instructions are provided so that the data to be received for three days from 10:00, May 1, 2006 (not shown) is input (section 1601). In this example, the data is input only if the telephone number of the transmitter is 012-345-6789 as indicated in transmitter telephone number field 1602. Sections 1603 and 1604 show conditions to print input data (time of printing and contact address), which are the same as the above-described example.

Now, the process performed after document input reservation has completed is described with reference to the flowchart shown in FIG. 5.

The flowchart shown in FIG. 5 illustrates the process performed by the binding application 209, the controller 202, and the system application 204.

In step S501, document input reservation registration ends and instructions to start binding and printing are provided, that is, press of the "start" button on the upper right in FIG. 11 is detected.

In step S502, the display and control of the screen of the copy machine are returned to the system application 204. That is, monitoring of the reserved device starts by the controller 202 (step S504).

In step S503, the operation panel is backed to an ID input screen (default screen) and a standby state occurs. That is, a screen of a normal state to wait for input in the copy machine is displayed. The screen shown in FIG. 6 is an example of the screen to select a function after an ID is input. That is, the multifunction apparatus can be operated by operating the system application 204, but the controller 202 continues to regularly monitor the device in the background until the document input conditions are satisfied (step S506).

In step S505, the system application 204 detects that a device in the copy machine is used, the controller 202 detects an event from the OS or interrupt from the hardware, and the process proceeds to step S506.

In step S506, the controller 202 determines whether the document input conditions are satisfied. For example, whether the expected time of scanning and the ID set in the screen shown in FIG. 12 are satisfied is determined. If the conditions are satisfied, the process proceeds to step S508.

In step S508, the system application 204 stores the data in a temporary area of the hard disk. Then, in step S509, the system application 204 transmits the stored image data to the binding application 209 that is waiting for input. Thereafter, the process is performed by the binding application 209. If any other task is being processed, the binding application 209 requests suspension of the task to the OS. Then, the binding application 209 performs input of document (step S510). Alternatively, the input of document may be performed in parallel with another task of high priority.

If the document input conditions are not satisfied in step S506, the process proceeds to step S507, where a normal operation, such as copying, is performed. For example, if a "copy" button is pressed while waiting for "scan and store" in FIG. 6, a normal copying operation is performed.

If the process proceeds to step S510 after the conditions are satisfied, the binding application 209 inserts the image data transferred from the system application 204 to the document.

In step S511, the binding application 209 determines whether the entire reserved document has been input. If the entire document has been input, the process proceeds to step S513, where binding and printing are performed. Then, in step S514, the binding application 209 transmits a notification that binding and printing have completed to the contact address by e-mail, and the process ends.

If the entire document has not been input in step S511, the process proceeds to step S512, where the binding application 209 determines whether the time of printing that is set as the binding and printing conditions has come. If the time of printing has come, the process proceeds to step S513 and printing is performed. If the time has not come, the process returns to step S504, where input of a document is waited for.

An example of the SCAN function is described above, but this is the same for BOX reception and FAX reception.

That is, if the system application 204 determines in step S505 that a BOX is used, the document input conditions of the BOX input on the screen shown in FIG. 14 are determined in step S506. If the conditions are satisfied, the process proceeds to step S508, where the system application 204 copies the data stored in the BOX having the BOX No. extracted from the conditions to the temporary area. In the example shown in FIG. 14, the data in the BOX No. 10 is obtained and copied.

Alternatively, if the system application 204 determines in step S505 that a FAX reception event occurs, the process proceeds to step S506, where it is determined whether the document input conditions input on the screen shown in FIG. 16 are satisfied. If the conditions are satisfied, the document is input.

In the case of receiving FAX, the received data may be printed at the same time of temporarily storing the data in the HDD in step S508. Both the output of data received by facsimile and the input of document can be performed at the same time. Whether this process is to be performed can be specified in advance to the controller 202 and the system application 204 in accordance with an input from the user interface of the binding application 209.

The copy machine (FIG. 1) is disclosed as an example of the image forming apparatus.

The copy machine includes the hard disk 12 to store data in which pages are defined.

Also, the copy machine includes the display and operation unit 7 (hereinafter referred to as an operation unit 7) to specify data to be inserted to data. Data in a specific BOX or data received by facsimile can be specified as the data to be inserted from the operation unit 7. The operation unit 7 provides instructions to insert the data specified by the operation unit 7 to a specific page of the data stored in the hard disk 12. Whether the data specified by the operation unit 7 has been received is determined.

If the CPU 9 determines that the data specified by the operation unit 7 has been received, the CPU 9 inserts the received data to the page specified by the operation unit 7 by using the binding application 209.

The conditions to insert the data specified by the operation unit 7 are indicated by the operation unit 7. If the conditions are satisfied, the CPU 9 performs an inserting process by using the binding application 209.

The operation unit 7 can display a preview of a bound state of the data stored in the hard disk 12.

An icon representing the function of a copy machine (e.g., 9001) is placed between specific pages or on a specific page shown in the preview (FIG. 11, 13, or 15) displayed by the operation unit 7.

Accordingly, the position to which the data is to be inserted can be indicated by the operation unit 7. The copy machine also includes the network processing unit 2 to transmit a notification of end of binding and printing to a mail address of a person who has provided the instructions.

The operation unit 7 can specify the expected time when data is to be received as the conditions. At the time specified by the operation unit 7, the controller 202 determines whether the data specified by the operation unit 7 has been received.

The copy machine disclosed here has a plurality of data processing functions. The copy machine includes the hard disk 12 to store data in which pages are defined.

An object 9002 shown in FIG. 9 is disclosed as an example of a first displayed object corresponding to the position where data is to be inserted to the data stored in the hard disk 12.

The object 9002 shown in FIG. 9 is the desired position of insertion, and the respective pages can be displayed in a list. If the user selects and indicates a position between pages, specified data is inserted to the position. If the user selects and indicates a page, the specified data is inserted just after or before (set in advance) the page.

Function icons as an example of second displayed objects corresponding to the functions held by the copy machine are displayed in the operation unit 7.

Icons 8005 to 8007 shown in FIG. 8 are examples of the function icons. The operation thereof is as described above.

One of the function icons displayed in the operation unit 7 and the object corresponding to the insertion position are selected by using the binding application 209.

The data processed by the function corresponding to the function icon selected by the binding application 209 is inserted to the desired position of the data specified by the operation unit 7.

The object 9002 visually indicates the insertion position in a plurality of pages in a state where the plurality of pages of the data stored in the hard disk 12 are displayed in a list. The function icons indicate the functions of the image forming apparatus.

The binding application 209 selects one of the function icons by detecting drag of the icon. By detecting drop of the icon on the object visually indicating the insertion position, the binding application 209 selects the position of the object 9002.

The copy machine has a function icon corresponding to at least one of an image input function by the scanner, a FAX receiving function, and a BOX function to store data transmitted from a computer via a network in the memory or hard disk in the copy machine.

The copy machine provided with an application and a control program to control the functions of the copy machine is disclosed.

Insertion conditions to insert data input to the copy machine to data managed by an application are obtained. In this embodiment, document input conditions are disclosed as an example of the insertion conditions. The copy machine processes data by controlling the above-described functions by using the control program. An event related to execution of data processing is detected by the controller. In response to the detected event, the binding application determines whether the obtained insertion conditions are satisfied. If the document input conditions are satisfied, the data processed by the control program is transmitted to the application and is edited.

The binding application can perform printing by applying specific binding and printing conditions that are specified from the operation unit 7 at input of document input reservation conditions. For example, binding with the 2 in 1 layout or stapling with the 1 in 1 layout can be specified.

The application according to the present invention is not limited to the binding application, but an OCR application can also be applied. The resolution of the OCR can be set at setting of document input reservation conditions. Accordingly, document input reservation by scanning can be realized so that binding or a specific process about OCR can be performed on read data.

With the above-described process, when a user performs binding and printing of sales report of each branch for a meeting of branch managers, the user friendliness can be enhanced. In the conventional method, the user waits until all documents are transmitted from the branches and then provides instructions to perform binding. That is, the user needs to wait until the last document is transmitted. On the other hand, according to the embodiment of the present invention, FAX reception and binding can be reserved on the copy machine, so that the documents transmitted from the branches can be automatically bound and a necessary number of copies can be printed. Accordingly, user friendliness can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-173625 filed Jun. 23, 2006, which is hereby incorporated by reference herein in its entirety.

What is claimed is:

1. An image forming apparatus having an input function, the apparatus comprising:
    a first display unit configured to display pages included in a document file;
    a selecting unit configured to select a position in which an image is inserted and an input function to input the image, the position being located between pages among the pages displayed by the first display unit;
    a second display unit configured to display an object corresponding to the input function at the position between pages selected by the selecting unit; and
    a changing unit configured to change the object displayed by the second display unit into an input image obtained by performing the input function.

2. The image forming apparatus according to claim 1, wherein the input function is either one of a scanner or a facsimile.

3. The image forming apparatus according to claim 2, further comprising:
    a third display unit configured to display a screen for designating an input condition for the input function,
    wherein if an input function matches the input condition designated via the screen, the changing unit changes the displayed input function into the image obtained by performing the input function, and
    wherein if an input function does not match the input condition designated via the screen, the image obtained by performing the input function is stored in a memory location accessible by the image forming apparatus.

4. A method of operating an image forming apparatus having an input function, the method comprising:
    displaying pages included in a document file on a first display unit;
    selecting a position in which an image is inserted and an input function to input the image, the position being located between pages among the pages displayed by the first display unit;
    displaying an object corresponding to the input function at the selected position between pages on a second display unit; and changing the displayed object into an input image obtained by performing the input function.

5. The method of operating an image forming apparatus according to claim 4,
wherein the input function is either one of a scanner or a facsimile.

6. The method of operating an image forming apparatus according to claim 5, further comprising:
displaying a screen on a third display unit for designating an input condition for the input function,
wherein if an input function matches the input condition designated via the screen, the displayed input function is changed into a display of the image obtained by performing the input function, and
wherein if an input function does not match the input condition designated via the screen, the image obtained by performing the input function is stored in a memory location accessible by the image forming apparatus.

7. A non-transitory computer-readable storage medium storing instructions, that, when executed by a processor, causes a method of operating an image forming apparatus to be performed, the method comprising:
displaying pages included in a document file on a first display unit;
selecting a position in which an image is inserted and an input function to input the image, the position being located between pages among the pages displayed by the first display unit;
displaying an object corresponding to the input function at the selected position between pages on a second display unit; and
changing the displayed object into an input image obtained by performing the input function.

8. The non-transitory computer-readable storage medium according to claim 7,
wherein the input function is either one of a scanner or a facsimile.

9. The non-transitory computer-readable storage medium according to claim 8, wherein the method further comprises:
displaying a screen on a third display unit for designating an input condition for the input function,
wherein if an input function matches the input condition designated via the screen, the displayed input function is changed into a display of the image obtained by performing the input function, and
wherein if an input function does not match the input condition designated via the screen, the image obtained by performing the input function is stored in a memory location accessible by the image forming apparatus.

* * * * *